Figure 1:
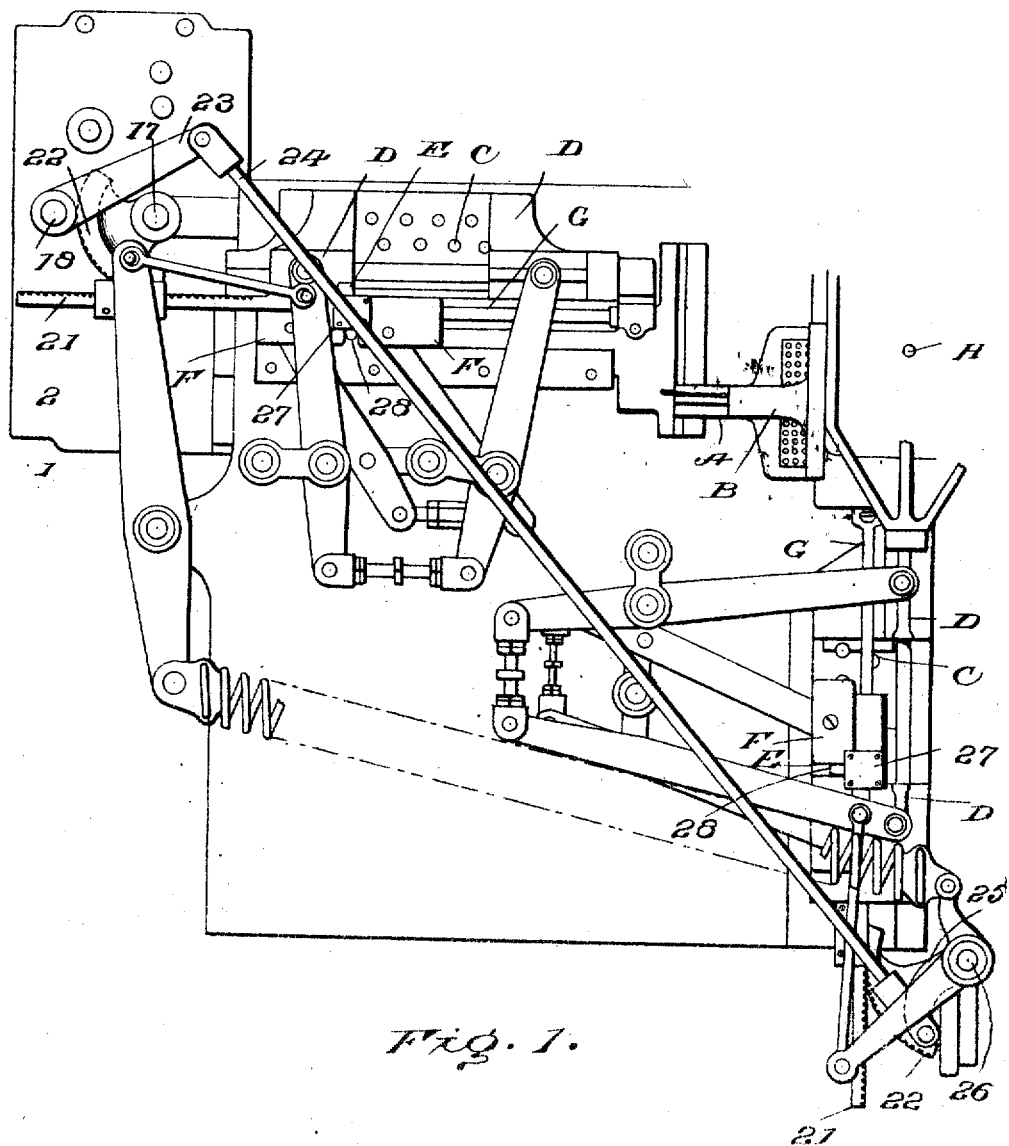

J. S. BANCROFT & M. C. INDAHL.
CONTROLLING MECHANISM FOR TYPE MACHINES.
APPLICATION FILED MAY 10, 1907.

924,957.

Patented June 15, 1909.
6 SHEETS—SHEET 1.

Witnesses
Thomas Durant

Inventors
John Sellers Bancroft
Mauritz C. Indahl
By Church & Church
Their Attorney

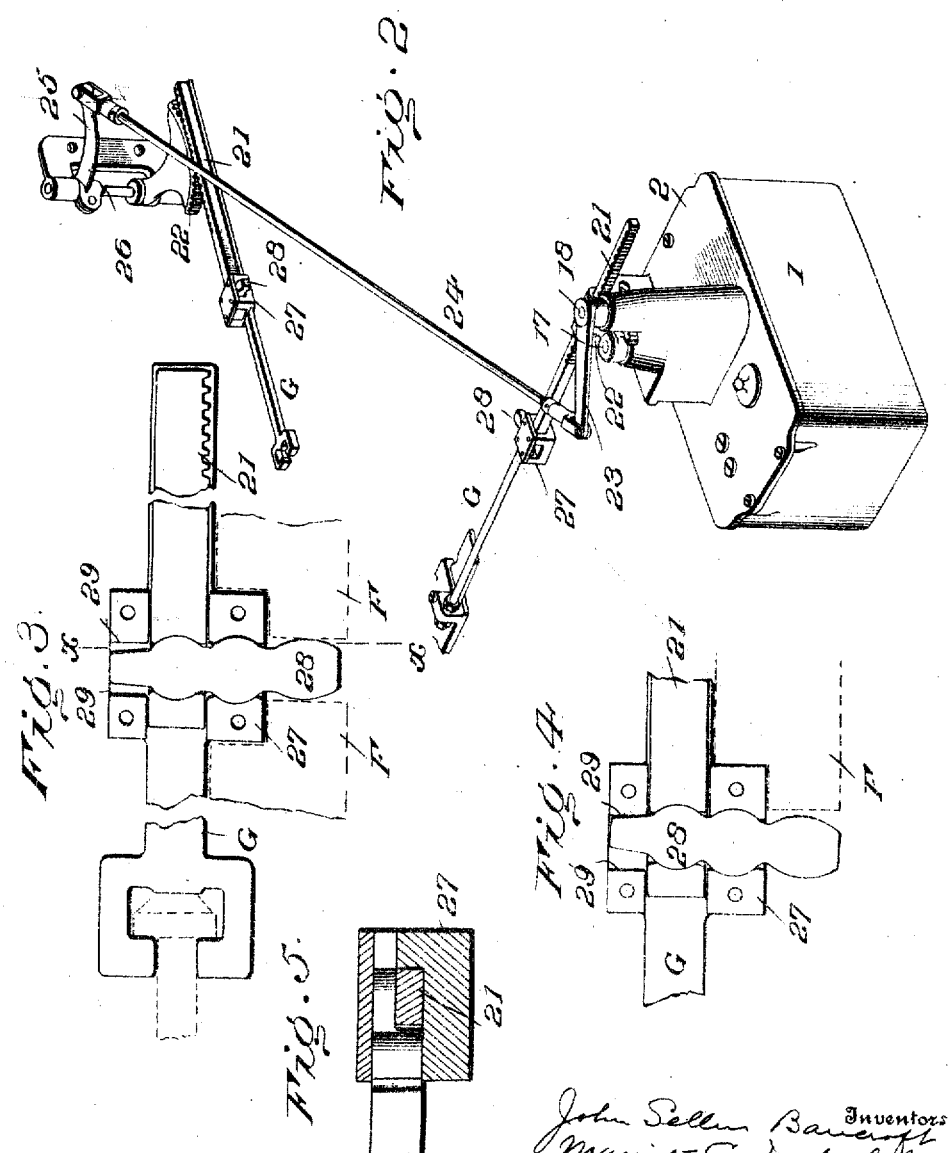

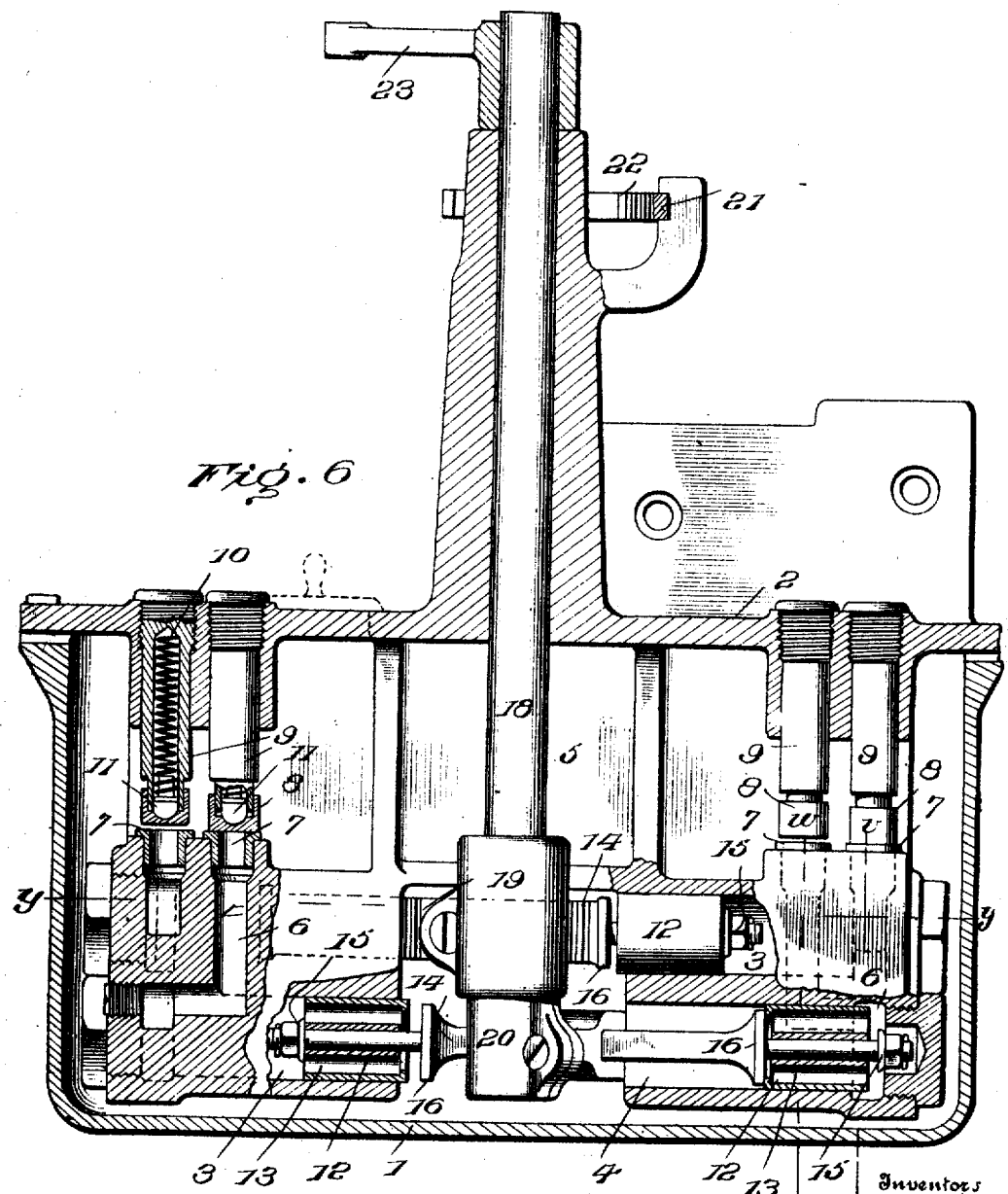

J. S. BANCROFT & M. C. INDAHL.
CONTROLLING MECHANISM FOR TYPE MACHINES.
APPLICATION FILED MAY 10, 1907.
924,957.
Patented June 15, 1909.
5 SHEETS—SHEET 4.
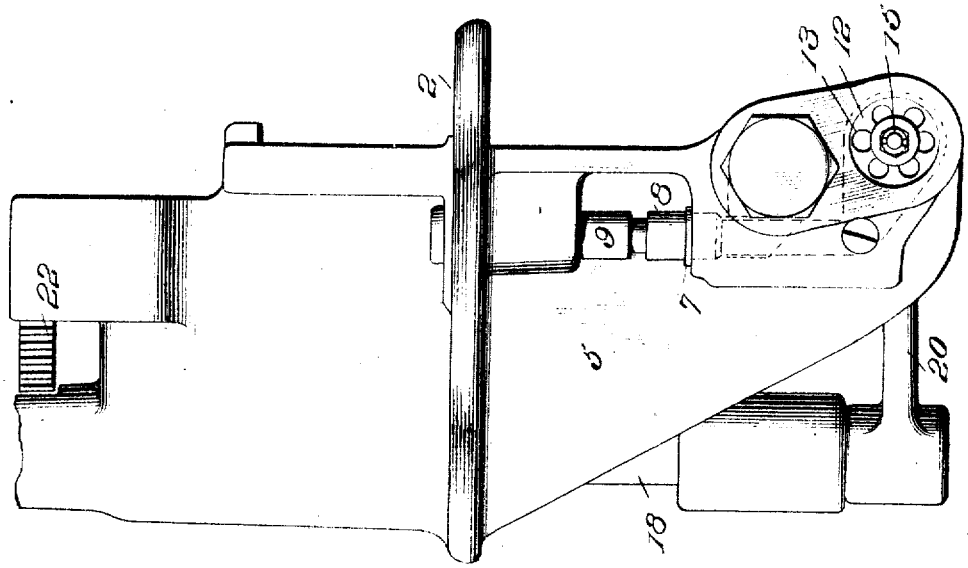
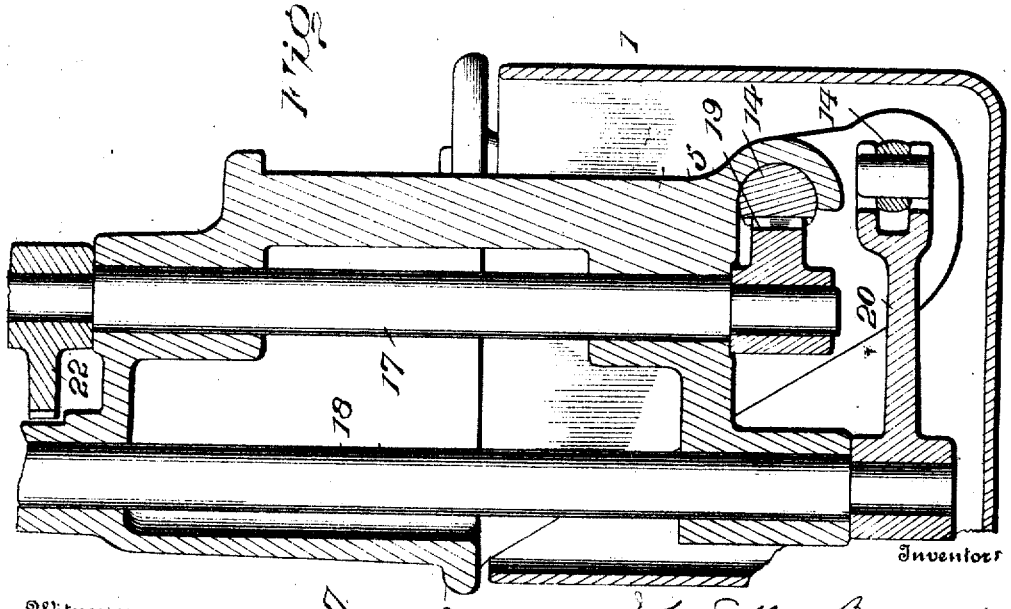

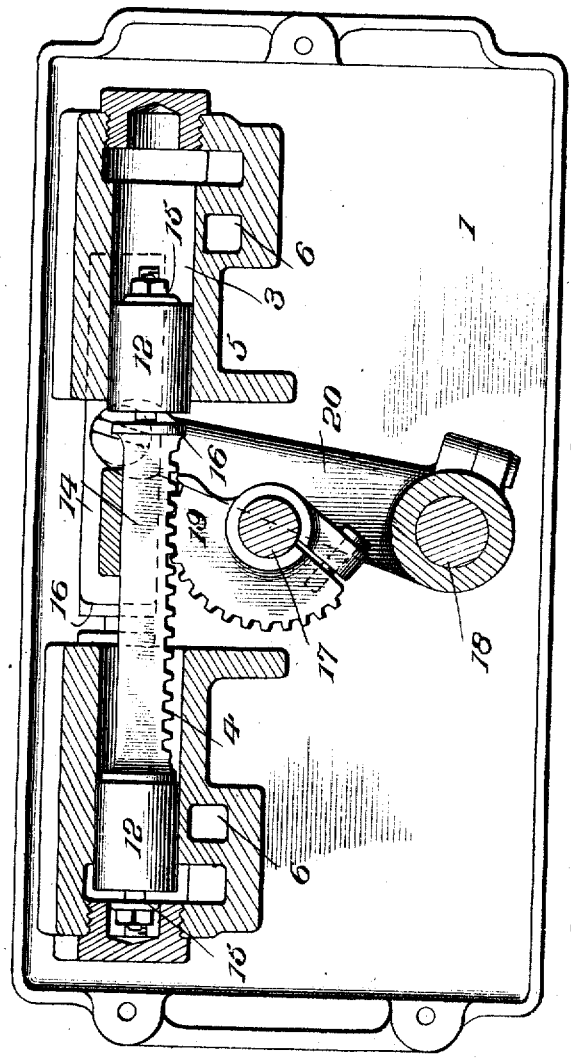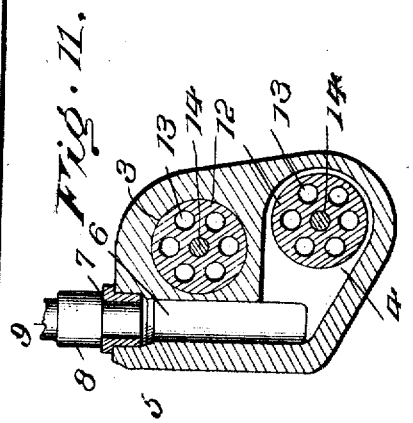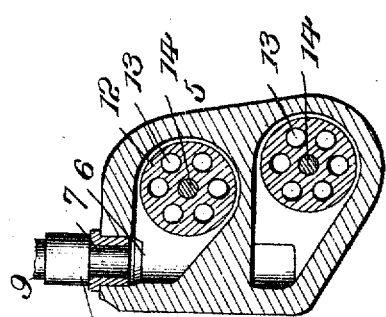

UNITED STATES PATENT OFFICE.

JOHN SELLERS BANCROFT AND MAURITZ C. INDAHL, OF PHILADELPHIA, PENNSYLVANIA, ASSIGNORS TO LANSTON MONOTYPE MACHINE COMPANY, OF PHILADELPHIA, PENNSYLVANIA, A CORPORATION OF VIRGINIA.

CONTROLLING MECHANISM FOR TYPE-MACHINES.

No. 924,957.     Specification of Letters Patent.     Patented June 15, 1909.

Application filed May 10, 1907. Serial No. 372,981.

*To all whom it may concern:*

Be it known that we, JOHN SELLERS BANCROFT and MAURITZ C. INDAHL, of Philadelphia, in the county of Philadelphia, State of Pennsylvania, have invented a certain new and useful Improvement in Controlling Mechanism for Type-Machines; and we do hereby declare the following to be a full, clear, and exact description of the same, reference being had to the accompanying drawings, forming a part of this specification, and to the figures and letters of reference marked thereon.

This invention relates to means for controlling the movements of a driven member, such as the die case of a type casting and composing machine, and has for its objects to increase the speed capacity of the machine as a whole and diminish wear and breakage.

One of the principal speed limiting factors in such machines is the momentum of the die case and associated movable elements. It is responsible for much of the wear which takes place on the guiding surfaces especially the sides of the matrices, and for the severe shocks to which the actuating and locating or positioning devices are subjected. Attempts have been made to modify its effects so as to diminish the shocks, prevent overthrow and increase the speed capacity of the machine by applying a mechanical friction or braking device to the driven members; but such attempts have been only partially successful owing, in part at least, to the inability to secure a device of this class possessing a uniform and constant coefficient of resistance under normal conditions of use, or one which would be regulable to accord with different rates of speed.

These and other defects and deficiencies are removed by the present invention which consists, primarily, in the employment of a hydraulic governor to resist the motion of translation; in a novel construction of the governor; in the use of a coupling device intermediate the governor and driven member adapted to automatically relieve the driven member from the controlling influence of the governor after being brought to final position, so that said driven member will be free to respond to other or supplemental centering or adjusting devices; and in the novel combinations, constructions and arrangements of parts hereinafter fully described and claimed.

In the accompanying drawings illustrating a preferred form of embodiment and application of the said invention: Figure 1 is a top plan view of a portion of a type machine with the improvements applied thereto. Fig. 2 is a view in perspective of the attachment including the hydraulic governor together with coupling devices for the die case and its carrier. Fig. 3 is a top plan view of the relief connection between the governor and die case or its carrier, the top plate being omitted. Fig. 4 is a similar view of the relief connection, showing the position and action of the lever during the translation period and before final centering. Fig. 5 is a sectional view on the line $x-x$, of Fig. 3. Fig. 6 is a longitudinal vertical section of the governor. Fig. 7 is a transverse vertical section of the same. Fig 8 is an end view of the governor. Fig. 9 is a horizontal section on line $y-y$ of Fig. 6. Fig. 10 and Fig. 11 are sectional views on lines $v-v$, and $w-w$, respectively, of Fig. 6.

Corresponding letters and numerals in the several views designate like parts.

For purposes of illustration the invention is shown as applied to the die-case centering mechanism forming part of the type casting and composing machine of Patent No. 625,998, dated May 30, 1899, to which reference is had for a more full disclosure.

It will suffice for present purposes to designate some of the principal elements of the patented machine with which the present invention is more directly connected in operation, such as die-case A equipped with a plurality of matrices; carrier B provided with guides for the die-case, and movable upon a supporting frame; primary controllers or fixed gages C; primary positioning or gaging mechanism represented by oppositely movable jaws D; secondary controllers or shiftable gages E; secondary positioning or gaging mechanism represented by oppositely movable jaws F; and translating devices G connected to the die case and its carrier and operated upon by jaws F to bring a matrix to the position indicated by gages E.

Gages E receive their setting during the opening or separating motions of jaws F, and as the latter close upon said gages they engage translating devices G and shift the die case and its carrier to the positions designated by said gages, after which the jaws separate leaving the die case free to respond to the action of a final positioning mechanism, such as the centering pin H. This preliminary centering or adjusting of the die-case is but one of a series of operations performed in the production of each type, and as the closing movement of jaws F occupies but a fraction of one revolution of the driving shaft the speed of translation of the die-case from one position to another is necessarily very rapid even when the machine is run at a comparatively low speed.

It is obvious that the degree of pressure necessary to overcome the inertia of the die case and its carrier when at rest greatly exceeds that required to maintain it in motion after it is once started. When, therefore, the die case or carrier is started in motion the actuating devices being under tension cause the engaging jaw to forcibly project the driven member against the opposite jaw, from which it rebounds, thus producing a hammer action which not only tends to rupture and deface the parts, but to set up vibrations especially injurious to the matrices and other bearing surfaces, in that it unduly increases the wear and thus interferes with the registry between individual matrices and the stations to which gages E are assigned.

This vibratory motion or hammer action incident to the preliminary centering of the die case is due in a large measure to the circumstance that the power expended in starting the driven member from a condition of rest is considerably in excess of that required to maintain it in motion, and is sufficient in degree to place the driving members under elastic tension, thereby storing up power which is expended immediately the inertia of the driven member is overcome and operates to project said driven member at a speed in excess of the normal speed of the driving member. To neutralize or overcome this tendency of the driven member to be projected or driven suddenly away from the driving member, each translating device has coupled with it a hydraulic governor adapted and operating to interpose a fixed measure of resistance sufficient to absorb or neutralize the movement imparted to the translating devices in excess of the normal speed of the jaw or driving member, thereby counteracting the effect of resilience and maintaining the driving and driven members in contact while in motion.

The hydraulic governor, so called, is an apparatus containing a movable member, such as a piston, operating to displace a liquid whose flow is restricted. In the preferred form of embodiment illustrated two such governors are employed, one for the die-case and the other for the carrier, but as they are duplicates a description of one will serve for both.

To the frame of the machine is secured a casing 1 provided with a detachable cover 2, and forming a receptacle for the liquid, preferably oil.

The governors are mounted upon and carried by the cover 2 so as to be removable therewith, and each comprises a pair of opposing cylinders 3, 4, formed in dependent frame 5 carried by cover 2, the proximate ends of said cylinders being open and the outer or opposite ends closed save for a duct 6 communicating with the interior of the chamber and terminating in a valve seat 7. An outward opening or puppet valve 8 rests normally upon seat 7, said valve being supported and guided upon the lower end of a tubular bolt 9 threaded through the cover, for adjustment, and carrying a spring 10 engaging a spherical ended plug 11 seated on the valve. Each cylinder 3, 4, is provided with a piston 12 containing a longitudinal passage or passages 13, and the two pistons are coupled together by means of a cross head or connecting rod 14 passing freely through bearings in the pistons and provided at each end with an engaging nut or shoulder 15, beyond the piston, and a valve 16 opposite the inner end of the piston, said valve seating on the piston to close passage 13 when the rod 14 is moved in a direction to force the piston toward the closed end of its cylinder. The interval between shoulder 15 and its associated valve 16 is somewhat in excess of that between their bearings on the piston in order that when the shoulder is engaged, to move the piston toward the open or inner end of its cylinder, the valve will be unseated and thus permit free entrance of liquid to the cylinder through passage 13.

It is apparent that if it be attempted to move rod 14 longitudinally in either direction the valve 16 at the front end will immediately seat on its piston, thus closing the inlet to its cylinder, while the valve 16 at the opposite end will be unseated, to open the inlet to its cylinder, after which further advance of the rod is prevented by the liquid entrapped in the cylinder until the load or resistance of spring 10 is overcome, when valve 8 will be lifted and held suspended while the liquid discharges from the cylinder into the chamber, the rate of discharge being proportional to the speed of the piston and the size of the discharge opening. Upon a reverse motion of the connecting rod the same action takes place at the opposite end, the cylinder at that end discharging while the rear cylinder is recharged. The object in thus checking the motion of the rod in either direction is to accommodate the movements of the die-case and its carrier in reverse directions from intermediate positions, and the arrangement of two independent pistons and opposing open-ended cylinders, instead of a single piston working in opposite directions in a closed cylinder provided with independent inlet and discharge valves, is preferred because it does away with stuffing boxes.

Connecting rods 14 are each coupled to move in unison with one of the translating devices G, so that the motion derived from jaws F will be transmitted through said translating devices to the rods 14 of the governor, thus applying the resistance to the driven member. A convenient arrangement for this purpose, one specially adapted to the machine illustrated, comprises two shafts 17, 18, supported in bearings on cover 2, and each coupled with one of the connecting or piston rods 14, as by a gear and rack connection 19, or an arm and pin connection 20. Each translating device G has associated with it a rack bar 21 and gear segment 22, one of the latter carried by shaft 17, and the other coupled with shaft 18, through arm 23, rod 24, arm 25, and shaft 26.

Were it not for interference with the action of the final positioning mechanism or centering pin, rack bars 21 might be formed integral with or secured to their respective translating devices G, but as this would require said final positioning mechanism to operate against the resistance of the hydraulic governors and greatly increase the wear upon the matrices, an indirect connection is preferred, one whereby the piston rods 14 of the governors will be effectively coupled with the die-case and carrier during the period of translation and until those devices are brought to the position indicated by gages E, and then released preliminary to the action of the final positioning mechanism. With this end in view heads 27 of the translating devices G, located between and against which jaws F impinge in moving the die case and carrier to indicated position, are each grooved to receive one end of a movable member or rack-bar 21, the latter being thus guided to reciprocate longitudinally of the translating device and in parallel with the movement of jaws F. Pivotally supported on head 27 is a lever 28 extending transversely of rack bar 21, the latter being cut away or grooved for the passage of said lever and to form a pivot bearing thereon as shown in Figs. 3 and 5. One end of lever 28 is projected beyond head 27 into the path of jaws F, the latter being notched or cut away to receive the head 27, while the overlapping or projecting portions of the jaws are so proportioned as to engage the end of lever 28 and hold the same at right angles to the bar 21 when both jaws are engaged with head 27 and the latter is clamped between them. The opposite end of lever 28 is movable between stops or abutments 29 on head 27.

As thus arranged when one member of a pair of jaws F engages head 27 to shift the die-case or carrier in either direction, the drag or resistance of the hydraulic governor will hold rack bar 21 stationary until the interlocking member or lever 28 contacts with its stop 29 when said rack bar will be compelled to follow the movement of the head 27 of the translating devices. This will carry the free end of lever 28 away from the advancing jaw F where it will remain until the head 27 is brought against the opposite or stationary jaw F, when lever 28 will be engaged by the overlapping end of the stationary jaw, and tilted slightly, thereby giving to the governor piston a movement slightly in excess of that given head 27 and withdrawing lever 28 from stop 29 into a position midway between the two stops. When now jaws F separate, as they do preparatory to the final centering operation, head 27 and with it the translating devices connected therewith, are left free to respond to the centering devices, while rack bar 21 retains its position, the requisite degree of independent movement being permitted by the free oscillation of lever 28 between stops 29. Thus the hydraulic governor is in effect disconnected during the final centering operation.

Having thus described our invention, what we claim as new and desire to secure by Letters Patent, is:

1. In a mechanism such as described provided with driving and driven members the former provided with elastic actuating devices and in combination therewith a hydraulic governing device coupled with the driven member when its inertia of rest is overcome by the driving member, to restrain its motion.

2. In a mechanism such as described provided with a driving member receiving motion through elastic actuating devices and an independently movable driven member, the combination with said driven member of a hydraulic governor.

3. In a mechanism such as described provided with independent driving and driven members the former receiving its motion through elastic actuating devices and in combination therewith a hydraulic governor coupled with the driven member and having a coefficient of resistance substantially equal to the resilient action of the driving members.

4. In a mechanism such as described provided with driving and driven members and in combination therewith a hydraulic governor coupled with the driven member and means for disconnecting the governor and driven member at the conclusion of the latter's movement.

5. In a mechanism such as described provided with two driven members movable one upon the other and independent driving members for said driven members, and in combination therewith, two hydraulic governors, one for each driven member, and means for coupling said governors to the driven members during the movements of translation and of releasing the latter at the termination of said movements.

6. In a type composing machine provided with a movable die-case and a driving or adjusting mechanism therefor, and in combination therewith, a hydraulic governor coupled with the die-case to resist movement of the latter.

7. In a type composing machine provided with a reciprocating die-case and a reciprocating support therefor, and actuating devices for adjusting said support and in combination therewith a hydraulic governor coupled with said die-case support.

8. In a type composing machine provided with a reciprocatory die-case, a reciprocatory support therefor and independent actuating or adjusting mechanisms for said die-case and its support, and in combination therewith, independent hydraulic governors coupled with the die-case and its support, respectively.

9. In a type composing machine the combination with a movable die case and actuating devices therefor, of a hydraulic governor coupled with said die-case and operating to resist the movements of the latter in relatively opposite directions.

10. In a type composing mechanism provided with a reciprocatory die-case, a support or carrier therefor mounted to reciprocate in guides transversely of the movement of its die-case, and actuating or centering mechanisms for said die-case and support, and in combination therewith two hydraulic governors separately coupled with the die-case and its support.

11. In a type composing mechanism the combination of the following elements; to wit, a reciprocatory member such as a die-case or its carrier provided with translating devices; a pair of oppositely movable jaws engaging said translating devices to shift and position said reciprocatory member; and a hydraulic governor coupled with said reciprocatory member.

12. In a type composing mechanism the combination of the following elements, to wit; a die case mounted to reciprocate upon a carrier or support, the latter adapted to reciprocate in lines transverse to the movement of the die-case; translating devices coupled with said die-case and carrier independent actuating or centering devices for said die-case and carrier each including a pair of oppositely movable jaws engaging the translating devices; and two independent hydraulic governors coupled with the die-case and carrier, respectively, operating to retard the motion.

13. In a type composing mechanism the combination with a reciprocatory member or die-case provided with translating devices, and centering or adjusting devices therefor including oppositely movable jaws engaging said translating devices, and in combination therewith, a hydraulic governor, and means for coupling the latter with the reciprocatory member or die case while under the control of the jaws and releasing said member or die case upon the withdrawal or opening of said jaws.

14. In a type composing machine the combination of the following elements, to wit; a movable member or die case; an adjusting mechanism for shifting said movable member provided with oppositely movable jaws; a hydraulic governor; and means for coupling said governor with said movable member during and releasing it after the period of translation from one position of adjustment to another.

15. In a type composing machine the combination of the following elements, to wit; a movable die case; an adjusting mechanism including oppositely movable jaws; a hydraulic governor; and means for coupling said governor with the die-case including means for automatically relieving the die case from the control of the governor when positioned by the adjusting mechanism.

16. In a type composing machine the combination of the following elements, to wit; a reciprocatory die-case; a positioning mechanism for shifting said die-case; a centering mechanism; a hydraulic governor; and means for coupling the governor to the die-case during the movement imparted by the positioning mechanism and for releasing the die-case during the action of the centering mechanism.

17. In a type composing machine the combination of the following elements, to wit; a reciprocatory die-case; a reciprocatory support for the die case; two sets of positioning devices one for the die-case and the other for its support; two hydraulic governors, one for the die-case and the other for its support; means for coupling the die case and support to their respective governors during translation; and means controlled by the positioning devices for releasing the governors.

18. In a type composing machine provided with a reciprocatory die-case; translating devices, a shiftable gage and oppositely movable positioning jaws, and in combination therewith, a hydraulic governor, means for coupling the latter with the translating devices, and means acted upon by the positioning jaws for releasing the die-case from the control of the governor.

19. In a mechanism provided with oppositely movable positioning jaws, a shiftable gage to determine the closed position of said jaws and translating devices acted upon by said jaws, and in combination therewith, a hydraulic governor and means for detachably coupling the latter with the translating devices.

20. In a mechanism provided with oppositely movable positioning jaws, gaging devices interposed between said jaws to determine the closed position thereof, and a translating device or driven member interposed between said jaws and in combination therewith a hydraulic governor for said translating device and means for coupling the latter with the governor while moving under the influence of the jaws, said coupling means including a member moving in unison with the governor and provided with a movable interlocking member.

21. In an adjusting mechanism comprising oppositely movable jaws, gaging means and a translating device interposed between said jaws, and in combination therewith, a movable member coupled with a resistant, and an interlocking device connecting said movable member and the translating device in a manner to permit limited independent motion.

22. In an adjusting mechanism such as described provided with oppositely movable jaws, a gage therefor and a translating device and in combination therewith, a movable member coupled with a resistant, and a lever interposed between the said movable member and translating device in position to be engaged by the jaws when closed.

23. In an adjusting mechanism such as described provided with oppositely movable jaws, a gage therefor and a translating device, and in combination therewith a lever carried by the translating device in position to be engaged by the jaws when closed and movable between limiting stops, and a hydraulic governor or resistant coupled with said lever.

24. In an adjusting mechanism such as described, the combination of the following elements, to wit; a pair of oppositely movable jaws; a gage for determining the closed positions of said jaws; a translating device interposed between the jaws and provided with a lever extending transversely of and into the line of movement of said jaws and stops for limiting the movement of said lever; and a resistant coupled with said lever.

25. In an adjusting mechanism such as described the combination of the following elements, to wit; a pair of oppositely movable jaws; means for determining the closed position of said jaws; a translating device interposed between said jaws; a bar supported in guides upon the translating device and coupled with a resistant; and means for interlocking said bar and translating device comprising a lever engaging said last named members movable between limiting stops and projecting into the path of the jaws.

26. In an adjusting mechanism such as described provided with a plurality of pairs of oppositely movable jaws, gages and translating devices and in combination therewith, a plurality of hydraulic governors, one for each translating device, and means for coupling each governor with its translating device while the latter is moving under the action of its jaws.

27. In an adjusting mechanism such as described provided with a plurality of pairs of oppositely movable jaws, gages and translating devices, and in combination therewith, a plurality of hydraulic governors, one for each translating device, means for coupling each governor to its translating device while the latter is moving under the influence of its jaws, and means controlled by the jaws for releasing the translating devices from their governors in the interval between successive engagements of the jaws.

JOHN SELLERS BANCROFT.
MAURITZ C. INDAHL.

Witnesses:
MORTIMER A. JONES,
JOSEPH B. CHURCH.